United States Patent
Iwamura et al.

(10) Patent No.: US 10,603,958 B2
(45) Date of Patent: Mar. 31, 2020

(54) AIRLESS TIRE (71) Applicant: SUMITOMO RUBBER INDUSTRIES LTD., Kobe-shi (JP)

(72) Inventors: Wako Iwamura, Kobe (JP); Makoto Sugiya, Kobe (JP); Hirotoshi Otsuki, Kobe (JP)

(73) Assignee: SUMITOMO RUBBER INDUSTRIES LTD., Kobe-shi (JP)

(*) Notice: Subject to any disclaimer, the term of this patent is extended or adjusted under 35 U.S.C. 154(b) by 671 days.

(21) Appl. No.: 15/219,746

(22) Filed: Jul. 26, 2016

(65) Prior Publication Data
US 2017/0057294 A1 Mar. 2, 2017

(30) Foreign Application Priority Data

Aug. 24, 2015 (JP) ................... 2015-164781

(51) Int. Cl.
*B60C 9/18* (2006.01)
*B60C 11/00* (2006.01)
*B60C 7/14* (2006.01)
*B60C 7/18* (2006.01)
(Continued)

(52) U.S. Cl.
CPC ............ *B60C 11/0041* (2013.01); *B60C 7/12* (2013.01); *B60C 7/14* (2013.01); *B60C 7/18* (2013.01); *B60C 7/20* (2013.01); *B60C 9/18* (2013.01); *B60C 11/0008* (2013.01); *B60C 2007/146* (2013.01); *B60C 2011/0025* (2013.01); *B60C 2011/0033* (2013.01); *Y02T 10/862* (2013.01)

(58) Field of Classification Search
CPC .... B60C 7/14; B60C 7/18; B60C 7/20; B60C 7/12; B60C 11/0041; B60C 11/0008; B60C 9/18
See application file for complete search history.

(56) References Cited

U.S. PATENT DOCUMENTS 5,202,363 A * 4/1993 Oberster ................. C07C 57/04
523/333
5,307,850 A * 5/1994 Halasa ...................... B60C 9/18
152/209.5
(Continued)

FOREIGN PATENT DOCUMENTS

EP          0620129 A1 * 10/1994  ............... B60C 9/08
JP       2014-218132 A     11/2014

*Primary Examiner* — Scott A Browne
(74) *Attorney, Agent, or Firm* — Oblon, McClelland, Maier & Neustadt, L.L.P.

(57) ABSTRACT

An airless tire includes a tread ring, a hub formed on radial direction inner side of the ring to be fixed to an axle, and a spoke structure connecting the ring and hub. The ring includes a tread rubber layer, a first reinforcing cord layer, a second reinforcing cord layer and a shear rubber layer between the first and second cord layers, the first and second cord layers and shear layer are formed such that ratio $Eb_1/Ee$ between tire circumferential direction tensile modulus $Eb_1$ of the first cord layer and shear modulus $Ee$ of the shear layer is 100 or greater and ratio $Eb_2/Ee$ between tire circumferential direction tensile modulus $Eb_2$ of the second cord layer and shear modulus $Ee$ is 100 or greater, and each cord layer has topping rubber having loss tangent tan $\delta b$ of 0.03 to 0.10 and tensile modulus $E^*b$ of 4 to 20 MPa.

20 Claims, 4 Drawing Sheets (51) Int. Cl.
*B60C 7/20* (2006.01)
*B60C 7/12* (2006.01)

(56) References Cited

U.S. PATENT DOCUMENTS

| | | | | |
|---|---|---|---|---|
| 2006/0048874 A1* | 3/2006 | Maruoka | ............ | B29D 30/3028 152/209.5 |
| 2006/0272757 A1* | 12/2006 | Mizuno | ................ | B60C 1/0016 152/209.5 |
| 2007/0267116 A1* | 11/2007 | Rhyne | ...................... | B60C 7/18 152/246 |
| 2014/0000779 A1* | 1/2014 | Naoi | .................... | B60C 9/0007 152/527 |

* cited by examiner

AIRLESS TIRE

CROSS-REFERENCE TO RELATED APPLICATIONS

The present application is based upon and claims the benefit of priority to Japanese Patent Application No. 2015-164781, filed Aug. 24, 2015, the entire contents of which are incorporated herein by reference.

BACKGROUND OF THE INVENTION

Field of the Invention

The present invention relates to an airless tire that allows a rolling resistance to be reduced.

Description of Background Art

An airless tire may have a structure in which a cylindrical tread ring and a hub are connected by multiple spoke plates. The cylindrical tread ring has a ground contact surface, the hub is fixed to an axle, and the spoke plates are radially arranged (for example, see Japanese Patent Laid-Open Publication No. 2014-218132). The entire contents of this publication are incorporated herein by reference.

SUMMARY OF THE INVENTION

According to one aspect of the present invention, an airless tire includes a tread ring which has a cylindrical form and a ground contact surface, a hub which is formed on a radial direction inner side of the tread ring and is to be fixed to an axle, and a spoke structure connecting the tread ring and the hub. The tread ring includes a tread rubber layer having the ground contact surface, a first reinforcing cord layer formed closest to the tread rubber layer, a second reinforcing cord layer formed on a radial direction inner side of the first reinforcing cord layer, and a shear rubber layer formed between the first and second reinforcing cord layers, the first and second reinforcing cord layers and the shear rubber layer are formed such that a ratio $Eb_1/Ee$ between a tire circumferential direction tensile modulus $Eb_1$ of the first reinforcing cord layer and a shear modulus $Ee$ of the shear rubber layer is 100 or greater and that a ratio $Eb_2/Ee$ between a tire circumferential tensile modulus $Eb_2$ of the second reinforcing cord layer and the shear modulus $Ee$ of the shear rubber layer is 100 or greater, and each of the first and second reinforcing cord layers has a topping rubber having a loss tangent tan $\delta b$ in the range of 0.03 to 0.10 and a tensile modulus $E^*b$ in the range of 4 to 20 MPa.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
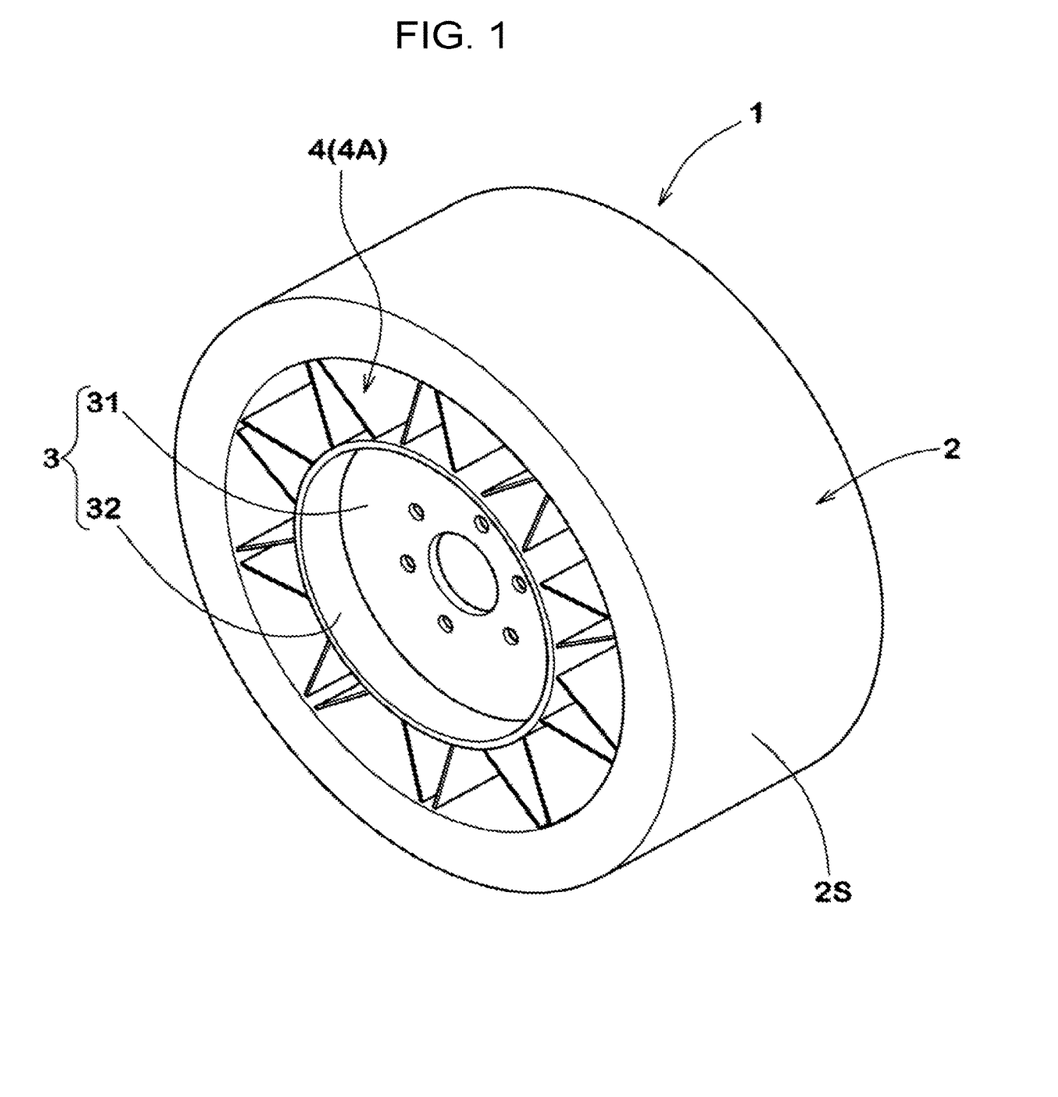
FIG. 1 is a perspective view illustrating an airless tire according to an embodiment of the present invention.

As illustrated in FIG. 1, an airless tire 1 of the present embodiment includes a cylindrical tread ring 2 that has a ground contact surface (2S), a hub 3 that is positioned on a radial direction inner side of the tread ring 2 and is fixed to an axle, and a spoke 4 that connects the tread ring 2 and the hub 3. In the present example, a case is illustrated where the airless tire 1 is formed as a passenger car tire.

The hub 3 corresponds to a tire wheel, and includes a disk-shaped disk part 31 that is fixed to the axle and a cylindrical spoke attaching part 32 that is formed on an outer periphery of the disk part 31. Similar to a tire wheel, the hub 3 is formed of a metal material such as steel, aluminum alloy or magnesium alloy.

The spoke 4 includes multiple spoke plates (4A) that substantially radially extend and connect the tread ring 2 and the hub 3. The spoke 4 is integrally molded with the tread ring 2 and the hub 3 by cast molding using a polymer material. As the polymer material, a thermoplastic resin or a thermosetting resin can be adopted. However, from a point of view of safety, a thermosetting resin, such as an epoxy resin, a phenolic resins, a urethane resin, a silicone resin, a polyimide resin, or a melamine resin, is preferred. In particular, a urethane resin has excellent elastic properties and thus can be more preferably adopted.

Figure 2:
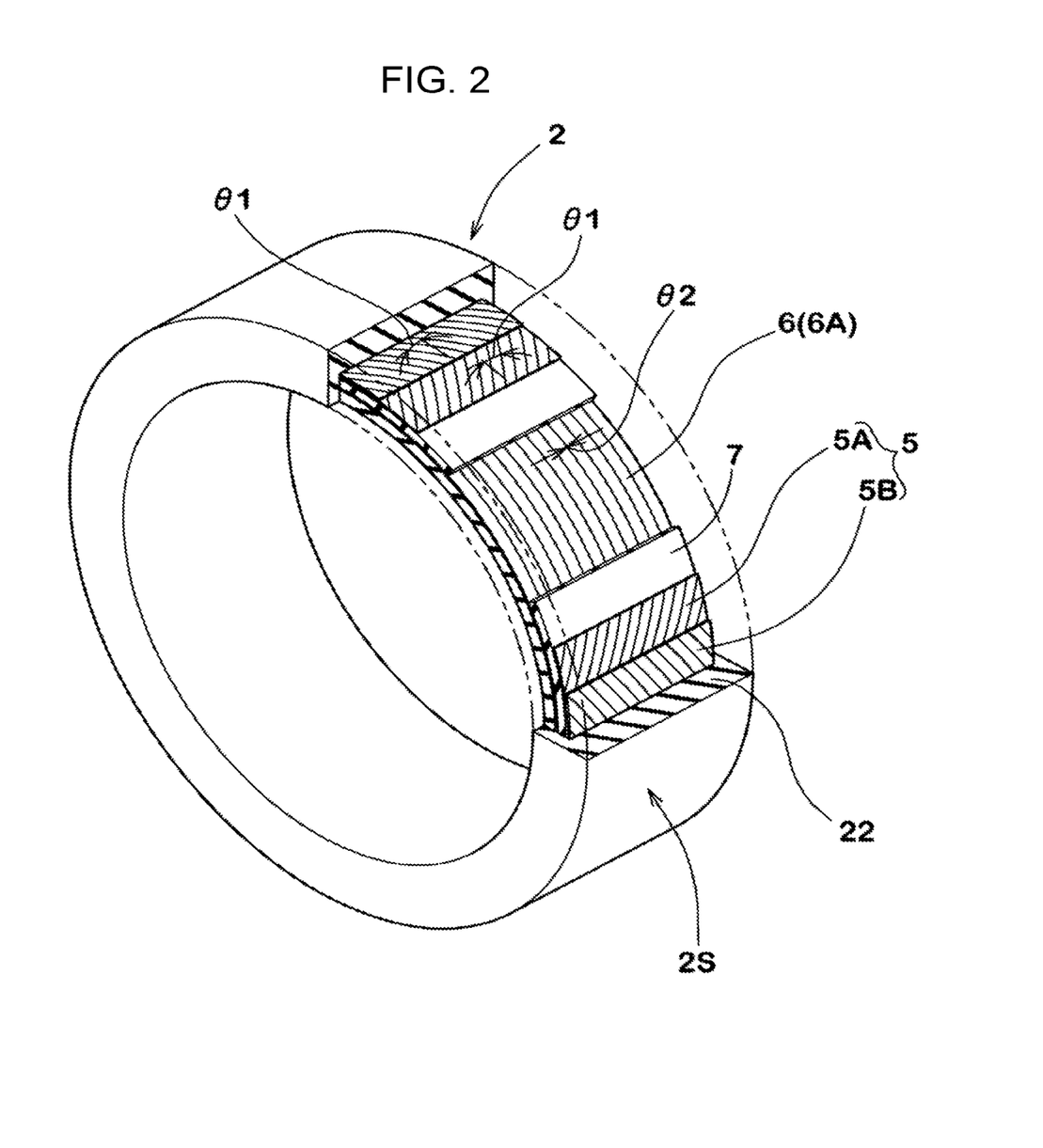
FIG. 2 is a perspective view illustrating a tread ring of FIG. 1.
Figure 3:
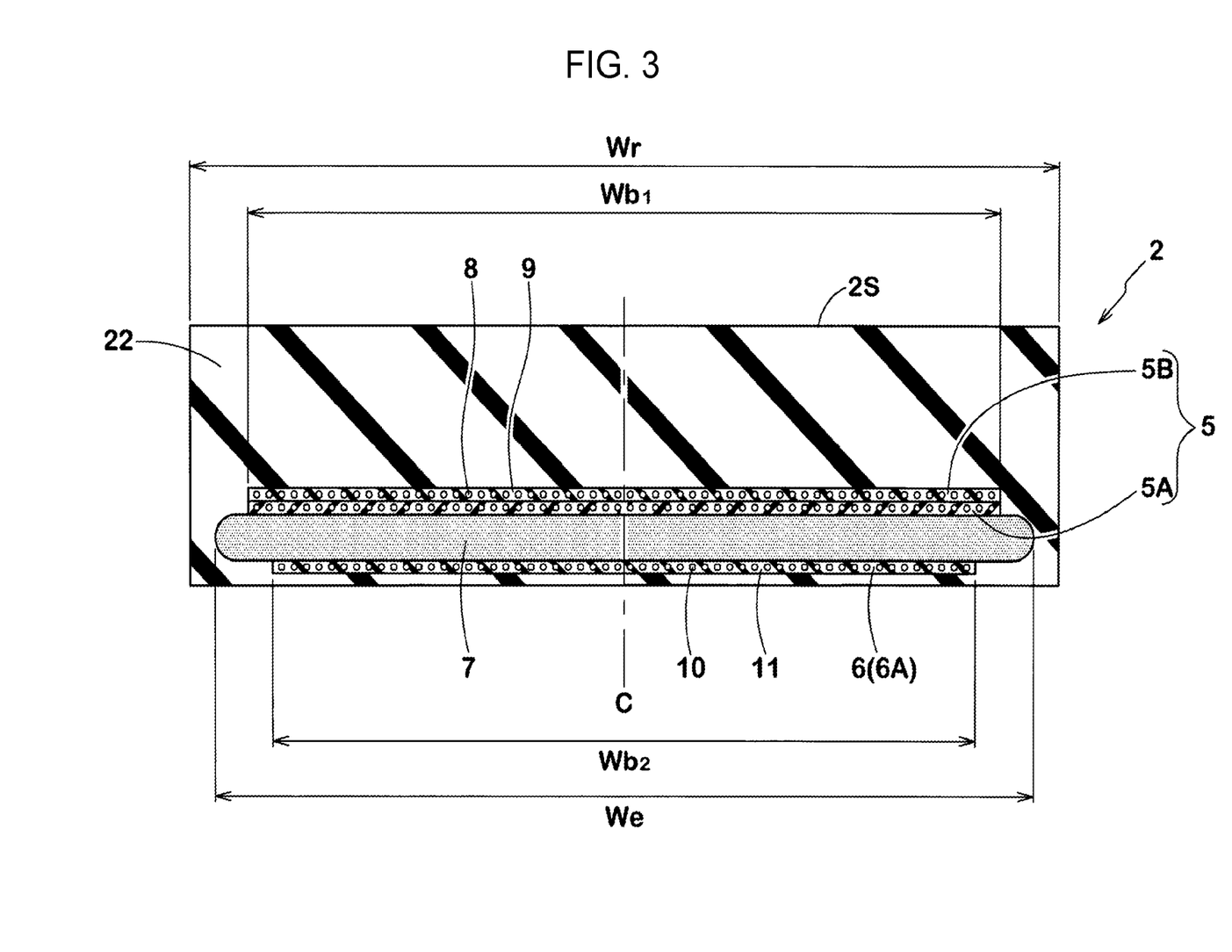
FIG. 3 is an enlarged cross-sectional view of the tread ring of FIG. 2.

Next, as illustrated in FIGS. 2 and 3, the tread ring 2 includes a tread rubber layer 22 that forms the ground contact surface (2S), a first reinforcing cord layer 5 that is positioned closest to the tread rubber layer 22, a second reinforcing cord layer 6 that is positioned on a tire radial direction inner side of the first reinforcing cord layer 5, and a shear rubber layer 7 that is positioned between the first and second reinforcing cord layers (5, 6). That is, the tread ring 2 has a sandwich structure in which the shear rubber layer 7 is sandwiched by the first and second reinforcing cord layers (5, 6).

On the ground contact surface (2S), which is an outer peripheral surface of the tread ring 2, tread grooves (not illustrated in the drawings) are formed in various pattern shapes in order to impart wet performance. Similar to a pneumatic tire, a rubber composition that is superior in grip force against a road surface and in wear resistance is preferably adopted for the tread rubber layer 22.

Figure 4A:
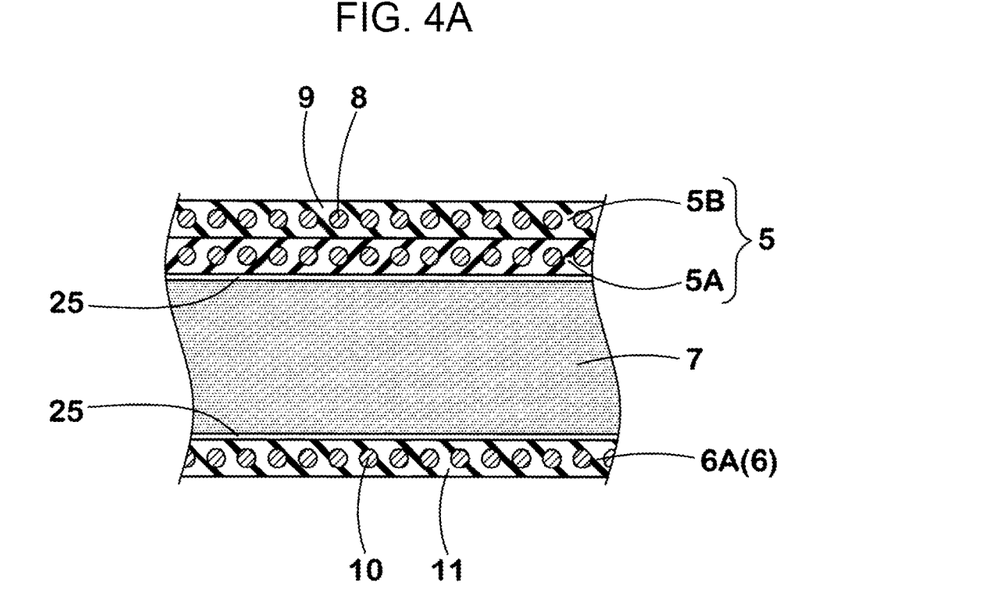
FIG. 4A is a partial enlarged cross-sectional view illustrating first and second reinforcing cord layers together with a shear rubber layer.

As illustrated in FIG. 4A, in the present example, the first reinforcing cord layer 5 is formed from a total of two cord plies (5A, 5B) that are respectively formed on radial direction inner and outer sides. The cord plies (5A, 5B) are each formed from a cord formation body in which reinforcing cords 8 are arrayed at an angle ($\theta 1$) (illustrated in FIG. 2) with respect to a tire circumferential direction and a topping rubber 9 that covers a surface of the cord formation body. The reinforcing cords 8, a cord formation density and the angle ($\theta 1$) of the first reinforcing cord layer 5 are appropriately set according to a tensile modulus ($Eb_1$) in the tire circumferential direction of the first reinforcing cord layer 5 (to be described later). In the present example, the cord plies (5A, 5B) each include a cord formation body in which steel cords (reinforcing cords 8) are arrayed, for example, at an angle (θ1) of 5-35 degrees. Further, the cord plies (5A, 5B) are formed such that directions of inclination of the reinforcing cords 8 are different between the plies so that the reinforcing cords 8 intersect each other between the plies. As a result, the first reinforcing cord layer 5 can enhance an in-plane rigidity, and can improve turning performance by increasing a cornering power that is generated when a slip angle is applied.

In the present example, the second reinforcing cord layer 6 is formed from one cord ply (6A). The cord ply (6A) is formed from a cord formation body in which reinforcing cords 10 are arrayed at an angle (θ2) (illustrated in FIG. 2) with respect to the tire circumferential direction and a topping rubber 11 that covers a surface of the cord formation body. The reinforcing cords 10, a cord formation density and the angle (θ2) of the second reinforcing cord layer 6 are also set according to a tensile modulus ($Eb_2$) in the tire circumferential direction of the second reinforcing cord layer 6 (to be described later). In the present example, the cord ply (6A) includes a cord formation body in which steel cords (reinforcing cords 10) are spirally wound at the angle (θ2) of less than 5 degrees. As a result, the second reinforcing cord layer 6 can increase the tensile modulus ($Eb_2$) in the tire circumferential direction while achieving reduction in weight.

The first and second reinforcing cord layers (5, 6) are respectively formed to be line-symmetric with respect to a tire equator line. When there is no line symmetry, when a load is applied, torsion occurs in the reinforcing cord layer 5 and/or the reinforcing cord layer 6, and the tread ring 2 deforms by distortion, and thus smooth rolling becomes difficult.

In order to ensure adhesion to the reinforcing cords (8, 10), in the present example, the topping rubbers (9, 11) that are used in the cord plies (5A, 5B, 6A) are formed of a sulfur vulcanized rubber composition that uses sulfur as a vulcanization agent, a rubber component of the sulfur vulcanized rubber composition being, for example, a natural rubber (NR), a butadiene rubber (BR), a diene rubber such as a styrene-butadiene rubber (SBR), or a mixture thereof.

Next, the shear rubber layer 7 is positioned between the first and second reinforcing cord layers (5, 6). As a result, a portion of a load that the tread ring 2 receives during traveling can be supported by a tensile elastic force in the tire circumferential direction of the first and second reinforcing cord layers (5, 6), and a deformation amount of the tread ring 2 can be suppressed by effectively increasing a load bearing capacity.

In this case, when the tensile moduli ($Eb_1$, $Eb_2$) of the first and second reinforcing cord layers (5, 6) are not sufficiently larger than a shear modulus (Ee) of the shear rubber layer 7, a function due to the sandwich structure cannot be achieved. Therefore, a ratio ($Eb_1/Ee$) and a ratio ($Eb_2/Ee$) of the moduli are respectively set to be 100 or more. As a result, the deformation amount of the tread ring 2 is kept low, and rolling resistance is reduced and excellent steering stability is ensured In particular, in order to suppress deformation of the tread ring 2, the ratio ($Eb_1/Ee$) and the ratio ($Eb_2/Ee$) are preferably 500 or more, and more preferably, 1000 or more. The tensile modulus ($Eb_1$) and the tensile modulus ($Eb_2$) may be different from each other. However, when the tensile modulus ($Eb_1$) and the tensile modulus ($Eb_2$) are different from each other, since one of the two reinforcing cord layers that has a higher tensile modulus becomes excessive in quality, it causes disadvantages in reduction in weight and in reduction in cost. Therefore, it is preferable that a ratio (Eb1/Eb2) between the tensile moduli ($Eb_1$, $Eb_2$) be in a range of 0.8-1.2, and it is particularly preferable that the tensile moduli ($Eb_1$, $Eb_2$) be equal to each other.

Further, as described above, in the airless tire 1, influence of properties of a rubber on properties of a tire is very large, about 10 times that in the case of a pneumatic tire. Therefore, also in the topping rubbers (9, 11), a small loss tangent (tan δb) and a high tensile modulus (E*b) are important for reduction in rolling resistance and reduction in weight.

Therefore, the loss tangent (tan δb) is restricted to a range of 0.03-0.10, and the tensile modulus (E*b) is restricted to a range of 4-20 MPa. When the loss tangent (tan δb) exceeds 0.10, it becomes difficult to sufficiently reduce the rolling resistance. On the other hand, in a sulfur vulcanized rubber composition, it is technically difficult to reduce the loss tangent (tan δb) to below 0.03. Further, when the tensile modulus (E*b) is less than 4 MPa, the topping rubbers (9, 11) become weak, and it is difficult to ensure sufficient rigidity in the tread ring 2. On the other hand, in a sulfur vulcanized rubber composition, it is difficult in manufacturing to increase the tensile modulus (E*b) to above 20 MPa. From such a point of view, it is preferable that an upper limit of the loss tangent (tan δb) be 0.05 or less. Further, a lower limit of the tensile modulus (E*b) is preferably 8 MPa or more, and more preferably 12 MPa or more.

The topping rubber 9 and the topping rubber 11 may be formed of different rubber compositions and have different loss tangents (tan δb) and tensile moduli (E*b). However, from a point of view of eliminating weakness, it is preferable that the topping rubbers (9, 11) be formed of the same rubber composition. When the topping rubbers (9, 11) are formed of different rubber compositions, the loss tangents (tan δb) and the tensile moduli (E*b) of the topping rubbers (9, 11) are respectively restricted to within the above-described ranges.

Figure 4B:
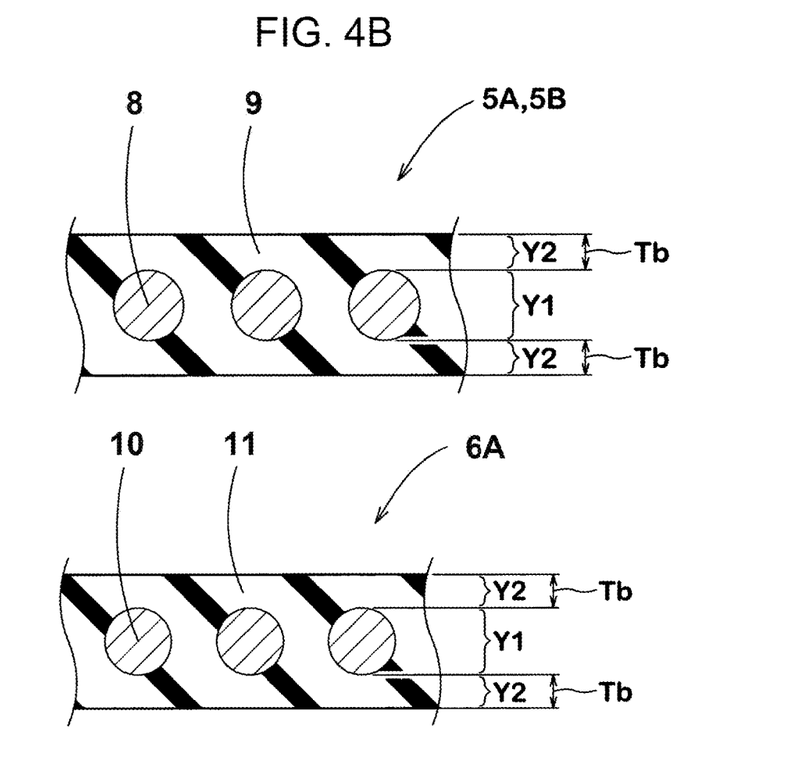
FIG. 4B is a partial enlarged cross-sectional view illustrating a cord ply.

As illustrated in FIG. 4B, each of the cord plies (5A, 5B, 6A) can be partitioned in a thickness direction thereof into a central region (Y1) in which the cord formation body and the topping rubber (9, 11) of the reinforcing cords (8, 10) are interposed, and a covering region (Y2) that is formed of only the topping rubber (9, 11). The covering region (Y2) is formed of only the topping rubber (9, 11) and thus has a low rigidity as compared to the central region (Y1) and the shear rubber layer 7 (to be described later). Therefore, in order to increase the rigidity of the entire sandwich structure, it is effective to reduce a thickness of the covering region (Y2) that has the lowest rigidity, that is, to reduce a covering thickness (Tb) of the topping rubber (9, 11). In the present example, the covering thickness (Tb) is reduced to 0.5 mm or less. As a result, it can contribute to the rigidity of the sandwich structure and thus the tread ring 2. It is preferable from a point of view of adhesion that a lower limit of the covering thickness (Tb) be 0.1 mm or more.

Further, it is also important that the shear modulus (Ee) of the shear rubber layer 7 be high. The higher the shear modulus (Ee) is, the more the load bearing capacity is increased. Therefore, the shear modulus (Ee) is preferably set to 20 MPa or more, and more preferably 30 MPa or more. This allows both the above-described ratio ($Eb_1/Ee$) and ratio ($Eb_2/Ee$) and the load bearing capacity to be further increased. As a result, low rolling resistance performance and steering stability can be further improved, or reduction in the weight of the tread ring 2 can be achieved while ensuring low rolling resistance performance and steering stability at a certain level. It is preferable that a thickness of the shear rubber layer 7 be 3 mm or more.

On the other hand, in order to reduce rolling resistance, it is also important that the shear rubber layer 7 be formed of a low heat generation rubber composition that has a small loss tangent (tan δ). As a result of an experiment, it is found that, when the loss tangent (tan δ) of the shear rubber layer 7 is about 0.06, a rolling resistance close to that of a pneumatic tire can be ensured. Therefore, in the present example, the loss tangent (tan δ) of the shear rubber layer 7 is set to 0.06 or less.

Here, in the case of a sulfur vulcanized rubber composition, when the loss tangent (tan δ) is reduced to 0.06 or less, the shear modulus (Ee) is also reduced. Therefore, in a sulfur vulcanized rubber composition, it is difficult to restrict the loss tangent (tan δ) to 0.06 or less and the shear modulus (Ee) to 20 MPa or more. In such a situation, as a result of a study, it is found that the above-described physical properties can be ensured by using, for example, a butadiene-based rubber composition A that uses an α, β-unsaturated carboxylic acid metal salt as a cross-linking agent. The rubber composition A has a low extensibility and is more brittle as compared to a normal sulfur vulcanized rubber composition, and thus is not used for a pneumatic tire. However, as in an embodiment of the present invention, when the rubber composition A is used as the shear rubber layer 7 of the sandwich structure, the shear rubber layer 7 is covered and protected by the first and second reinforcing cord layers (5, 6), and thus is not directly subjected to an impact from outside. Further, even when local bending occurs, the local bending is relaxed by the tread rubber layer 22 and the first and second reinforcing cord layers (5, 6), and thus the rubber composition A can be used without causing a problem in endurance strength.

Next, the rubber composition A of the shear rubber layer 7 is described. Table 1 illustrates a formulation example of the rubber composition A.

TABLE 1

| Shear Rubber Layer | Rubber Composition A |
|---|---|
| Natural Rubber (NR) | 10 |
| Butadiene Rubber (BR) | 90 |
| Carbon Black | 0 |
| α,β-Unsaturated Carboxylic Acid Metal Salt (Zinc Methacrylate) | 40 |
| Peroxide | 1 |
| Zinc oxide | 0 |
| Sulfur | 0 |
| Vulcanization Accelerator | 0 |

The rubber composition A contains 10-80 parts by weight of an α, β-unsaturated carboxylic acid metal salt with respect to 100 parts by mass of a rubber component of which a content rate of a butadiene rubber (BR) is 10-100% by mass, and contains a peroxide. In the rubber composition A, the butadiene rubber (BR) and the α, β-unsaturated carboxylic acid metal salt co-cross-link with each other with the peroxide as an initiator, and thereby, high elasticity and low heat generation, which are difficult to achieve in a sulfur vulcanized rubber material, are achieved.

The rubber component contains 10-100% by mass of the butadiene rubber (BR) in the 100 parts by mass. When the butadiene rubber (BR) is used by being blended with another rubber, examples of the rubber for the blending include a natural rubber (NR), a styrene butadiene rubber (SBR), an isoprene rubber (IR), a chloroprene rubber (CR), a styrene isoprene butadiene rubber (SIBR), a styrene-isoprene rubber (SIR), an epoxidized natural rubber (ENR), and the like. These rubbers can be used either individually or in combination of two or more. Among these rubbers, NR is preferable for being excellent in low heat generation.

The content rate of the butadiene rubber (BR) is 10% or more by weight, and is preferably 20% or more by weight. When the content rate of the butadiene rubber (BR) is below 10% by weight, there is a tendency that an effect on achieving low heat generation is reduced. Further, when the content rate of the butadiene rubber (BR) is 100% by weight, there is a tendency that strength is reduced. Therefore, an upper limit of the content rate of the butadiene rubber (BR) is preferably 90% or less by weight, and more preferably 80% or less by weight.

As a co-cross-linking agent, the α, β-unsaturated carboxylic acid metal salt is adopted, which is a metal salt of an α, β-unsaturated carboxylic acid such as acrylic acid, methacrylic acid, maleic acid, fumaric acid, or itaconic acid. In particular, for being excellent in durability, an acrylic acid metal salt and/or a methacrylic acid metal salt are preferable, and a methacrylic acid metal salt is even more preferable. Further, examples of the metal in the α, β-unsaturated carboxylic acid metal salt include zinc, sodium, magnesium, calcium, aluminum and the like, among which, zinc is preferred for allowing sufficient hardness to be obtained.

The content of the co-cross-linking agent (α, β-unsaturated carboxylic acid metal salt) is 10-80 parts by weight with respect to 100 parts by weight of the rubber component. When the content of the α, β-unsaturated carboxylic acid metal salt is below 10 parts by weight, a sufficient cross-link density cannot be obtained. Further, when the content of the α, β-unsaturated carboxylic acid metal salt exceeds 80 parts by weight, it becomes too hard and the strength is also reduced. From such a point of view, a lower limit of the content of the α, β-unsaturated carboxylic acid metal salt is preferably 12 parts or more by weight, and an upper limit of the content of the α, β-unsaturated carboxylic acid metal salt is preferably 50 parts or less by weight and more preferably 35 parts or less by weight.

Examples of the peroxide include benzoyl peroxide, dicumyl peroxide, di-t-butyl peroxide, t-butyl cumyl peroxide, methyl ethyl ketone peroxide, cumene hydroperoxide, 2, 5-dimethyl-2, 5-di (t-butylperoxy) hexane, 2, 5-dimethyl-2, 5-di (benzoyl peroxy) hexane, t-butyl peroxy benzene, 2, 4-dichlorobenzoyl peroxide, 1, 1-di-t-butyl-peroxy-3, 3, 5-trimethyl cyclohexane, n-butyl-4, 4-di-t-butylperoxyvalerate, and the like. These may be used either individually or in combination of two or more. Among these, the dicumyl peroxide is preferable.

It is preferable that the content of the peroxide be 0.1-6.0 parts by weight with respect to 100 parts by weight of the rubber component. When the content of the peroxide is below 0.1 parts by weight, there is a tendency that a sufficient hardness cannot be obtained. Further, when the content of the peroxide exceeds 6 parts by weight, there is a tendency that the cross-link density becomes too high and the strength is reduced. From such a point of view, it is more preferable that a lower limit of the peroxide be 0.2 parts or more by weight and an upper limit of the peroxide be 2 parts or less by weight.

The rubber composition A may also contain a reinforcing filler. Examples of the reinforcing filler include carbon black, silica, calcium carbonate, clay, talc, alumina, aluminum hydroxide, and the like. However, carbon black is particularly preferred. When the reinforcing filler is contained, the content of the reinforcing filler is preferably 90 parts or less by weight and more preferably 50 parts or less by weight with respect to 100 parts by weight of the rubber component. When the content of the reinforcing filler exceeds 90 parts by weight, there is risk that excellent low heat generation cannot be achieved.

In addition to the rubber component, the co-cross-linking agent (α, β-unsaturated carboxylic acid metal salt), the peroxide and the reinforcing filler, the rubber composition A may also contain compounding agents that are used in tire industry, such as zinc oxide, wax, stearic acid, oil, an anti-aging agent, and a vulcanization accelerator, within ranges such that the effect of an embodiment of the present invention is not impaired.

The rubber composition A contains the co-cross-linking agent (α, β-unsaturated carboxylic acid metal salt), and thus does not contain a vulcanizing agent such as sulfur or a sulfur compound. However, when the shear rubber layer 7 is adjacent to the first and second reinforcing cord layers (5, 6), there is a risk that, during vulcanization, sulfur contains in the topping rubbers of the reinforcing cord layers (5, 6) migrates to the shear rubber layer 7 and the physical properties of the shear rubber layer 7 are changed. Therefore, in the present example, as exaggeratedly illustrated in FIG. 4, it is preferable that an insulation layer 25 that prevents the migration of sulfur be interposed between the first reinforcing cord layer 5 and the shear rubber layer 7 and between the second reinforcing cord layer 6 and the shear rubber layer 7. The insulation layer 25 is not particularly restricted. However, for example, an adhesive such as CHEMLOK 6100-6254 (product name of LORD Corporation) or the like can achieve both an effect of preventing migration of sulfur and an effect of adhesion, and thus can be preferably adopted. The insulation layer 25 is not particularly restricted in thickness. However, when the insulation layer 25 is too thin, the effect of adhesion cannot be achieved; and when the insulation layer 25 is too thick, the adhesion layer itself becomes brittle and thus is likely to break. From such a point of view, the thickness of the insulation layer 25 is preferably 3-100 μm, and more preferably 7-50 μm.

Further, as illustrated in FIG. 3, it is preferable that a tire axial direction width (We) of the shear rubber layer 7 be 0.6-0.99 times a tire axial direction width (Wr) of the tread ring 2, and tire axial direction widths ($Wb_1$, $Wb_2$) of the first and second reinforcing cord layers (5, 6) be each 0.6-0.99 times the width (Wr).

In the tread ring 2, the load bearing capacity is achieved by the sandwich structure of the first and second reinforcing cord layers (5, 6) and the shear rubber layer 7. Therefore, the width (We) of the shear rubber layer 7 and the widths ($Wb_1$, $Wb_2$) of the first and second reinforcing cord layers (5, 6) are respectively sufficiently wide with respect to the width (Wr) of the tread ring 2. When the width (We) and the widths ($Wb_1$, $Wb_2$) are each below 0.6 times the width (Wr), a sufficient load bearing capacity cannot be achieved. On the other hand, when the width (We) and the widths ($Wb_1$, $Wb_2$) each exceed 0.99 times the width (Wr), outer edges of the first and second reinforcing cord layers (5, 6) and the shear rubber layer 7 are likely to be exposed from side surfaces of the tread ring 2, and there is a risk that damages such as peeling may occur with the exposed portions of the first and second reinforcing cord layers (5, 6) and the shear rubber layer 7 as starting points.

Since the load bearing capacity is achieved by the sandwich structure, it is preferable that the width (We) and the widths ($Wb_1$, $Wb_2$) be substantially equal to each other. Therefore, it is preferable that a ratio (W max/W min) between a maximum value (W max) and a minimum value (W min) among the width (We) and the widths ($Wb_1$, $Wb_2$) be 1.1 or less.

In the above, an embodiment of the present invention is described in detail. However, the present invention is not limited by the embodiment illustrated in the drawings, but can be carried out in various modified forms.

EXAMPLES

Airless tires (tires corresponding to a tire size of 145/70R12) that each form the basic structure of FIG. 1 are prototyped, and rolling resistance performance is tested. Specifications of the tires, except the tread ring, are substantially the same. The spoke is integrally formed with the tread ring and the hub using a cast molding method using a urethane resin (thermosetting resin). The first and second reinforcing cord layers are as follows. The tensile modulus ($Eb_1$) in the tire circumferential direction is changed by changing a diameter of the reinforcing cords, the number of the cords, and the angle of the cords.

First Reinforcing Cord Layer

Number of Plies: 2

Reinforcing Cords: Steel Cords

Angle of Cords: +21 degrees or −21 degrees

Second Reinforcing Cord Layer

Number of Plies: 1

Reinforcing Cords: Steel Cords

Angle of Cords: 0 degree (spiral winding)

Shear Rubber Layer

Thickness: 4 mm

As the shear rubber layer:

(1) In Example 16, the rubber composition A having a basic composition as illustrated in Table 1 is used, and the shear modulus (Ee) is adjusted by adjusting the content of α, β-unsaturated carboxylic acid metal salt.

(2) In Comparative Examples and Examples other than Example 16, a sulfur vulcanized rubber composition (B) that uses a diene rubber is used, and the shear modulus (Ee) is adjusted by adjusting the contents of carbon black and sulfur.

As the topping rubber of the first and second reinforcing cord layers:

(3) In all of Comparative Examples and Examples, a sulfur vulcanized rubber composition (C) that uses a diene rubber is used, and the loss tangent (tan δb) and the tensile modulus (E*b) are adjusted by adjusting the contents of carbon black and sulfur.

Rolling Resistance Performance

A rolling resistance coefficient ((rolling resistance)/load× 104) that is measured using a rolling resistance tester under a condition in which a speed is 40 km/h and a load is 1.17 kN is displayed. A smaller value means a better rolling resistance.

Steering Stability

The prototyped tires are mounted on four wheels of a vehicle (small EV; product name: COMS). The vehicle, driven by one person, is run on a tire test course with a dry asphalt road surface. Steering stability is displayed using a 10-point method based on sensory evaluation by the driver. A larger value means a better operation stability.

TABLE 2

| | Comparative Example 1 | Example 1 | Example 2 | Example 3 | Example 4 | Example 5 | Example 6 | Example 7 | Example 8 | Example 9 |
|---|---|---|---|---|---|---|---|---|---|---|
| $Eb_1/Ee$ | | | | | | 1000 | | | | |
| $Eb_2/Ee$ | | | | | | 1000 | | | | |
| $E*b$ (MPa) | 3.0 | 5.0 | 4.0 | 8.0 | 12.0 | | | | 5.0 | |
| tan δb | | | | | | 0.05 | | | | |
| Shear Modulus Ee (MPe) | | 50 | | | | 20 | 15 | | 50 | |
| We/Wr | | | | 0.85 | | | | 0.99 | 0.6 | 0.5 |
| $Wb_1/Wr$ | | | | 0.85 | | | | 0.99 | 0.6 | 0.5 |
| $Wb_2/Wr$ | | | | 0.85 | | | | 0.99 | 0.6 | 0.5 |
| Tb (mm) | | | | | | 0.4 | | | | |
| Steering Stability | 8 | 10 | 9 | 10 | 10 | 9 | 9 | 10 | 9 | 9 |
| Rolling Resistance | 200 | 110 | 130 | 80 | 70 | 130 | 140 | 105 | 125 | 135 |
| Mass (Tread Ring) (Kg) | | | | | | 3.5 | | | | |

| | Example 10 | Example 11 | Example 12 | Example 13 | Comparative Example 2 | Example 14 | Comparative Example 3 | Example 15 | Comparative Example 4 | Example 16 |
|---|---|---|---|---|---|---|---|---|---|---|
| $Eb_1/Ee$ | | 1000 | | 100 | 80 | | | 1000 | | |
| $Eb_2/Ee$ | | 1000 | | 100 | 80 | | | 1000 | | |
| $E*b$ (MPa) | | | | | | 5.0 | | | | |
| tan δb | | | 0.05 | | | 0.03 | 0.02 | 0.10 | 0.12 | 0.05 |
| Shear Modulus Ee (MPe) | | | | | | 50 | | | | |
| We/Wr | 0.85 | 0.5 | | | 0.85 | | | 0.99 | 0.6 | 0.5 |
| $Wb_1/Wr$ | 0.85 | 0.5 | | | 0.85 | | | 0.99 | 0.6 | 0.5 |
| $Wb_2/Wr$ | 0.85 | 0.5 | | | 0.85 | | | 0.99 | 0.6 | 0.5 |
| Tb (mm) | 0.5 | 0.6 | 0.2 | | | | 0.4 | | | |
| Steering Stability | 9 | 9 | 10 | 9 | 8 | 10 | 10 | 9 | 9 | 10 |
| Rolling Resistance | 120 | 130 | 90 | 140 | 180 | 105 | 100 | 130 | 150 | 105 |
| Mass (Tread Ring) (Kg) | | | | | | 3.5 | | | | |

As illustrated in Table 2, the tires of the examples allow rolling resistance to be reduced while ensuring excellent steering stability.

In an airless tire, for a tread rubber layer that forms the ground contact surface of a tread ring, a conventional rubber material for a pneumatic tire may be used, which may be advantageous from a point of view of grip performance, wear resistance, and the like.

However, in a pneumatic tire, a load is supported by air that has a very small hysteresis loss, whereas in an airless tire, a load is supported by solid parts, specifically, a tread ring and spoke plates, that have large hysteresis losses as compared to the air. Therefore, when a tread component that is used for a tread part of a pneumatic tire is used "as is" for a tread ring of an airless tire, a problem occurs that a rolling resistance of the airless tire deteriorates to about 2.5 times of that of the pneumatic tire.

Therefore, to reduce the rolling resistance of an airless tire to a level of a pneumatic tire, a tread ring using a structure different from a tread structure of a pneumatic tire and using a component having physical properties different from those of a tread component of a pneumatic tire is formed.

An airless tire according to an embodiment of the present invention allows rolling resistance to be reduced while ensuring excellent steering stability, based on adopting a sandwich structure for a tread ring in which a shear rubber layer is sandwiched between first and second reinforcing cord layers, and respectively determining values of ratios between tire circumferential direction tensile moduli of the first and second reinforcing cord layers and a shear modulus of the shear rubber layer, and values of a loss tangent (tan δb) and a tensile modulus ($E*b$) of a topping rubber of each of the first and second reinforcing cord layers.

An airless tire according to an embodiment of the present invention includes: a cylindrical tread ring that has a ground contact surface; a hub that is formed on a radial direction inner side of the tread ring and is fixed to an axle; and a spoke that connects the tread ring and the hub. The tread ring includes: a tread rubber layer that has the ground contact surface; a first reinforcing cord layer that is positioned closest to the tread rubber layer; a second reinforcing cord layer that is positioned on a radial direction inner side of the first reinforcing cord layer; and a shear rubber layer that is positioned between the first and second reinforcing cord layers. A ratio ($Eb_1/Ee$) between a tire circumferential direction tensile modulus ($Eb_2$) of the first reinforcing cord layer and a shear modulus (Ee) of the shear rubber layer and a ratio ($Eb_2/Ee$) between a tire circumferential direction tensile modulus ($Eb_2$) of the second reinforcing cord layer and the shear modulus (Ee) of the shear rubber layer are each 100 or more. A topping rubber of each of the first and second reinforcing cord layers has a loss tangent (tan δb) in a range of 0.03-0.10 and a tensile modulus ($E*b$) in a range of 4-20 MPa.

In an airless tire according to an embodiment of the present invention, it is preferable that the shear modulus (Ee) be 20 MPa or more.

In an airless tire according to an embodiment of the present invention, the tensile modulus ($E*b$) is preferably 8 MPa or more, and more preferably 12 MPa or more.

In an airless tire according an embodiment of the present invention, it is preferable that the topping rubber be formed of a sulfur vulcanized rubber composition that uses sulfur as a vulcanization agent.

In an airless tire according to an embodiment of the present invention, it is preferable that a tire axial direction width (We) of the shear rubber layer be 0.6-0.99 times a tire axial direction width (Wr) of the tread ring, and tire axial direction widths ($Wb_1$, $Wb_2$) of the first and second reinforcing cord layers be each 0.6-0.99 times the width (Wr).

In an airless tire according to an embodiment of the present invention, it is preferable that the topping rubber of each of the first and second reinforcing cord layers have a covering thickness (Tb) of 0.5 mm or less.

In an airless tire according to an embodiment of the present invention, it is preferable that the shear rubber layer be formed of a rubber composition that contains 10-80 parts by weight of an α, β-unsaturated carboxylic acid metal salt with respect to 100 parts by mass of a rubber component of which a content rate of a butadiene rubber is 10-100% by mass, and contain a peroxide.

The tire circumferential direction tensile moduli ($Eb_1$, $Eb_2$) of the first and second reinforcing cord layers are static tensile moduli that are measured according to JIS K6251 at a temperature of 30° C. and a tire circumferential direction extension of 2.00%. A test specimen may be formed by cutting from a tread ring after vulcanization, and may also be formed by press vulcanizing an unvulcanized reinforcing cord layer at a temperature of 170° C. for 20 minutes before the formation of a tread ring.

The shear modulus (Ee) of the shear rubber layer is a value of ⅓ times a static tensile modulus that is measured according to JIS K6251 at a temperature of 30° C. and an extension of 2.00%. A test specimen may be formed by cutting from a tread ring after vulcanization, and may also be formed by press vulcanizing an unvulcanized shear rubber layer at a temperature of 170° C. for 20 minutes before the formation of a tread ring.

The loss tangent (tan δb) and the tensile modulus (complex modulus) (E*b) of the topping rubber are values that are measured according to JIS-K6394 using a viscoelasticity spectrometer for predetermined initial strain (10%), dynamic strain (±1%), frequency (10 Hz), deformation mode (tensile), and measurement temperature (30° C.). A test specimen is formed by press vulcanizing a topping rubber at a temperature of 170° C. for 20 minutes before the formation of a reinforcing cord layer.

In order to reduce rolling resistance of an airless tire, it is important that a low heat generation rubber having a low loss tangent (tan δ) be used for a rubber that is used in a tread ring and a deformation amount of the rubber be kept low.

Therefore, in an embodiment of the present invention, as described above, a sandwich structure is adopted for a tread ring in which the shear rubber layer is sandwiched by the first and second reinforcing cord layers. Therefore, a portion of a load that the tread ring receives during traveling can be supported by a tensile elastic force in the circumferential direction of the first and second reinforcing cord layers, and the deformation amount of the tread ring can be kept low.

In this case, when the tensile moduli ($Eb_1$, $Eb_2$) of the first and second reinforcing cord layers are too small as compared to the shear modulus (Ee) of the shear rubber layer, the above-described function due to the sandwich structure cannot be sufficiently achieved. Therefore, in order to keep low the deformation amount of the tread ring and to reduce the rolling resistance and improve steering stability, it is important that the ratios ($Eb_1$/Ee) and ($Eb_2$/Ee) be each 100 or more.

On the other hand, for the topping rubbers of the first and second reinforcing cord layers, a smaller loss tangent (tan δb) and a higher tensile modulus (E*b) allow reduction in rolling resistance and reduction in weight to be achieved and are preferable for achieving low fuel consumption.

As a sulfur vulcanized topping rubber used for a pneumatic tire, a rubber having a tensile modulus (E*b) of less than 4 MPa may be adopted. A reason for this is that, in a pneumatic tire, contribution to rigidity of the tire by increasing the tensile modulus (E*b) of the topping rubber is small and, from a point of view of factors in manufacturing, such as ease of molding, a rubber having a tensile modulus (E*b) of less than 4 MPa is adopted.

However, in an airless tire, influence of properties of a rubber on properties of a tire is about 10 times that in the case of a pneumatic tire. This is due to that, in an airless tire, a load is entirely supported by components, whereas in a pneumatic tire, about 90% of a load is supported by the air.

Therefore, in an airless tire, the influence of the topping rubber on the properties of the tire also becomes large. When the tensile modulus (E*b) of the topping rubber is 4 MPa or more, the rigidity of the tread ring is easily ensured, and a higher tensile modulus (E*b) is more preferable for achieving reduction in rolling resistance, reduction in weight, improvement in steering stability, and the like. However, in a sulfur vulcanized rubber composition, it is difficult in manufacturing to increase the tensile modulus (E*b) to above 20 MPa. Further, when the loss tangent (tan δb) of the topping rubber is 0.1 or less, the rolling resistance can be sufficiently reduced, and a lower loss tangent (tan δb) is more preferable for reducing the rolling resistance. However, in a sulfur vulcanized rubber composition, it is technically difficult to reduce the loss tangent (tan δb) to below 0.03. For this reason, the loss tangent (tan δb) of the topping rubber is restricted to 0.03-0.10, and the tensile modulus (E*b) of the topping rubber is restricted to 4-20 MPa.

Obviously, numerous modifications and variations of the present invention are possible in light of the above teachings. It is therefore to be understood that within the scope of the appended claims, the invention may be practiced otherwise than as specifically described herein.

What is claimed is:

1. An airless tire, comprising:
    a tread ring having a cylindrical form and a ground contact surface;
    a hub formed on a radial direction inner side of the tread ring and configured to be fixed to an axle; and
    a spoke structure connecting the tread ring and the hub,
    wherein the tread ring comprises a tread rubber layer having the ground contact surface, a first reinforcing cord layer formed on a radial direction inner side of the ground contact surface of the tread rubber layer, a second reinforcing cord layer formed on a radial direction inner side of the first reinforcing cord layer, and a shear rubber layer formed between the first and second reinforcing cord layers, the first and second reinforcing cord layers and the shear rubber layer are formed in the tread rubber layer such that a ratio $Eb_1$/Ee between a tire circumferential direction tensile modulus $Eb_1$ of the first reinforcing cord layer and a shear modulus Ee of the shear rubber layer is 100 or greater and that a ratio $Eb_2$/Ee between a tire circumferential direction tensile modulus $Eb_2$ of the second reinforcing cord layer and the shear modulus Ee of the shear rubber layer is 100 or greater, and each of the first and second reinforcing cord layers has a topping rubber formed of a sulfur vulcanized rubber composition and having a loss tangent tan δb in a range of 0.03 to 0.05 and a tensile modulus E*b in a range of 8 to 20 MPa.

2. The airless tire according to claim 1, wherein the shear modulus Ee is 20 MPa or greater.

3. The airless tire according to claim 1, wherein the tensile modulus E*b is 12 MPa or greater.

4. The airless tire according to claim 1, wherein the shear rubber layer has a tire axial direction width We in a range of 0.6 to 0.99 times a tire axial direction width Wr of the tread ring, the first reinforcing cord layer has a tire axial direction width $Wb_1$ in a range of 0.6 to 0.99 times the width Wr, and the second reinforcing cord layer has a tire axial direction width $Wb_2$ in a range of 0.6 to 0.99 times the width Wr.

5. The airless tire according to claim 1, wherein the topping rubber of the first reinforcing cord layer has a covering thickness Tb in a range of 0.5 mm or less, and the topping rubber of the second reinforcing cord layer has a covering thickness Tb in a range of 0.5 mm or less.

6. The airless tire according to claim 1, wherein the shear rubber layer is formed of a rubber material formed from a rubber composition comprising a peroxide, a rubber component and an α, β-unsaturated carboxylic acid metal salt in an amount in a range of 10 to 80 parts by weight with respect to 100 parts by mass of the rubber component, and the rubber component comprises a butadiene rubber in a content rate in a range of 10 to 100% by mass.

7. The airless tire according to claim 2, wherein the tensile modulus E*b is 12 MPa or greater.

8. The airless tire according to claim 2, wherein the shear rubber layer has a tire axial direction width We in a range of 0.6 to 0.99 times a tire axial direction width Wr of the tread ring, the first reinforcing cord layer has a tire axial direction width $Wb_1$ in a range of 0.6 to 0.99 times the width Wr, and the second reinforcing cord layer has a tire axial direction width $Wb_2$ in a range of 0.6 to 0.99 times the width Wr.

9. The airless tire according to claim 2, wherein the topping rubber of the first reinforcing cord layer has a covering thickness Tb in a range of 0.5 mm or less, and the topping rubber of the second reinforcing cord layer has a covering thickness Tb in a range of 0.5 mm or less.

10. The airless tire according to claim 2, wherein the shear rubber layer is formed of a rubber material formed from a rubber composition comprising a peroxide, a rubber component and an α, β-unsaturated carboxylic acid metal salt in an amount in a range of 10 to 80 parts by weight with respect to 100 parts by mass of the rubber component, and the rubber component comprises a butadiene rubber in a content rate in a range of 10 to 100% by mass.

11. The airless tire according to claim 7, wherein the shear rubber layer has a tire axial direction width We in a range of 0.6 to 0.99 times a tire axial direction width Wr of the tread ring, the first reinforcing cord layer has a tire axial direction width $Wb_1$ in a range of 0.6 to 0.99 times the width Wr, and the second reinforcing cord layer has a tire axial direction width $Wb_2$ in a range of 0.6 to 0.99 times the width Wr.

12. The airless tire according to claim 7, wherein the topping rubber of the first reinforcing cord layer has a covering thickness Tb in a range of 0.5 mm or less, and the topping rubber of the second reinforcing cord layer has a covering thickness Tb in a range of 0.5 mm or less.

13. The airless tire according to claim 7, wherein the shear rubber layer is formed of a rubber material formed from a rubber composition comprising a peroxide, a rubber component and an α, β-unsaturated carboxylic acid metal salt in an amount in a range of 10 to 80 parts by weight with respect to 100 parts by mass of the rubber component, and the rubber component comprises a butadiene rubber in a content rate in a range of 10 to 100% by mass.

14. The airless tire according to claim 3, wherein the shear rubber layer has a tire axial direction width We in a range of 0.6 to 0.99 times a tire axial direction width Wr of the tread ring, the first reinforcing cord layer has a tire axial direction width $Wb_1$ in a range of 0.6 to 0.99 times the width Wr, and the second reinforcing cord layer has a tire axial direction width $Wb_2$ in a range of 0.6 to 0.99 times the width Wr.

15. The airless tire according to claim 3, wherein the topping rubber of the first reinforcing cord layer has a covering thickness Tb in a range of 0.5 mm or less, and the topping rubber of the second reinforcing cord layer has a covering thickness Tb in a range of 0.5 mm or less.

16. The airless tire according to claim 3, wherein the shear rubber layer is formed of a rubber material formed from a rubber composition comprising a peroxide, a rubber component and an α, β-unsaturated carboxylic acid metal salt in an amount in a range of 10 to 80 parts by weight with respect to 100 parts by mass of the rubber component, and the rubber component comprises a butadiene rubber in a content rate in a range of 10 to 100% by mass.

17. The airless tire according to claim 8, wherein the topping rubber of the first reinforcing cord layer has a covering thickness Tb in a range of 0.5 mm or less, and the topping rubber of the second reinforcing cord layer has a covering thickness Tb in a range of 0.5 mm or less.

18. The airless tire according to claim 8, wherein the shear rubber layer is formed of a rubber material formed from a rubber composition comprising a peroxide, a rubber component and an α, β-unsaturated carboxylic acid metal salt in an amount in a range of 10 to 80 parts by weight with respect to 100 parts by mass of the rubber component, and the rubber component comprises a butadiene rubber in a content rate in a range of 10 to 100% by mass.

19. The airless tire according to claim 11, wherein the topping rubber of the first reinforcing cord layer has a covering thickness Tb in a range of 0.5 mm or less, and the topping rubber of the second reinforcing cord layer has a covering thickness Tb in a range of 0.5 mm or less.

20. The airless tire according to claim 11, wherein the shear rubber layer is formed of a rubber material formed from a rubber composition comprising a peroxide, a rubber component and an α, β-unsaturated carboxylic acid metal salt in an amount in a range of 10 to 80 parts by weight with respect to 100 parts by mass of the rubber component, and the rubber component comprises a butadiene rubber in a content rate in a range of 10 to 100% by mass.

* * * * *